United States Patent
Owings

(10) Patent No.: US 10,739,660 B2
(45) Date of Patent: Aug. 11, 2020

(54) ARTICLES WITH RESISTANCE GRADIENTS FOR UNIFORM SWITCHING

(71) Applicant: 3M INNOVATIVE PROPERTIES COMPANY, St. Paul, MN (US)

(72) Inventor: Robert R. Owings, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/331,323

(22) PCT Filed: Sep. 21, 2017

(86) PCT No.: PCT/US2017/052729
§ 371 (c)(1),
(2) Date: Mar. 7, 2019

(87) PCT Pub. No.: WO2018/057744
PCT Pub. Date: Mar. 29, 2018

(65) Prior Publication Data
US 2019/0353970 A1    Nov. 21, 2019

Related U.S. Application Data

(60) Provisional application No. 62/398,930, filed on Sep. 23, 2016.

(51) Int. Cl.
*G02F 1/155* (2006.01)
*H01B 5/14* (2006.01)

(52) U.S. Cl.
CPC .............. *G02F 1/155* (2013.01); *H01B 5/14* (2013.01)

(58) Field of Classification Search
None
See application file for complete search history.

(56) References Cited

U.S. PATENT DOCUMENTS 4,365,010 A * 12/1982 Bard .................. G02F 1/155
  359/265
5,066,111 A * 11/1991 Singleton .............. G02F 1/1525
  359/245

(Continued)

FOREIGN PATENT DOCUMENTS

CN    103370649    10/2013
EP    2673674    12/2013

(Continued)

OTHER PUBLICATIONS

International Search Report for PCT International Application No. PCT/US2017/052729, dated Dec. 1, 2017, 4 pages.

*Primary Examiner* — Timothy J Thompson
*Assistant Examiner* — Muhammed Azam
(74) *Attorney, Agent, or Firm* — Qiang Han

(57) ABSTRACT

An article includes a transparent non-conducting layer, wherein a thickness of the transparent non-conducting layer continuously decreases in a first direction; and a transparent conducting layer on the transparent non-conducting layer, wherein a thickness of the transparent conducting layer continuously decreases in a direction opposite to the first direction. A thickness of the article is substantially uniform. A sheet resistance, $R_s$, to a flow of electrical current through the transparent conducting layer, varies as a function of position in the transparent conducting layer. A ratio of a value of maximum sheet resistance, $R_{max}$, to a value of minimum sheet resistance, $R_{min}$, in the transparent conducting layer is at least 1.5.

17 Claims, 1 Drawing Sheet

(56) References Cited

U.S. PATENT DOCUMENTS

| | | | | |
|---|---|---|---|---|
| 5,923,457 A * | 7/1999 | Byker | | B60R 1/088 |
| | | | | 359/265 |
| 6,111,684 A * | 8/2000 | Forgette | | B60Q 1/2665 |
| | | | | 359/267 |
| 7,147,923 B2 * | 12/2006 | Roberts | | B32B 27/08 |
| | | | | 428/423.3 |
| 7,230,779 B2 * | 6/2007 | Kunii | | G02B 5/205 |
| | | | | 359/588 |
| 7,317,566 B2 | 1/2008 | Tench | | |
| 8,274,494 B2 * | 9/2012 | Frey | | G06F 3/044 |
| | | | | 345/174 |
| 8,294,975 B2 * | 10/2012 | Varaprasad | | B60R 1/089 |
| | | | | 359/267 |
| 8,717,658 B2 | 5/2014 | Bergh | | |
| 8,808,810 B2 * | 8/2014 | Veerasamy | | B82Y 30/00 |
| | | | | 427/508 |
| 9,036,242 B2 | 5/2015 | Bergh | | |
| 9,052,786 B2 * | 6/2015 | Kuriki | | G06F 3/044 |
| 9,207,514 B2 * | 12/2015 | Choi | | G02F 1/1523 |
| 9,256,111 B2 * | 2/2016 | Choi | | G02F 1/1523 |
| 9,271,396 B2 * | 2/2016 | Nakamura | | G06F 3/044 |
| 9,360,729 B2 * | 6/2016 | Choi | | G02F 1/1533 |
| 9,370,095 B2 * | 6/2016 | Kuriki | | G06F 3/041 |
| 9,658,508 B1 * | 5/2017 | Bass | | G02F 1/163 |
| 9,904,393 B2 * | 2/2018 | Frey | | G06F 3/0414 |
| 10,061,177 B2 * | 8/2018 | Choi | | B05D 1/005 |
| 10,386,688 B1 * | 8/2019 | Sharpe | | E06B 9/24 |
| 2006/0262377 A1 * | 11/2006 | Kojima | | G02F 1/155 |
| | | | | 359/265 |
| 2007/0053046 A1 * | 3/2007 | Tench | | G02F 1/155 |
| | | | | 359/237 |
| 2009/0219257 A1 * | 9/2009 | Frey | | G06F 3/044 |
| | | | | 345/173 |
| 2012/0200908 A1 * | 8/2012 | Bergh | | G02F 1/155 |
| | | | | 359/275 |
| 2013/0020557 A1 * | 1/2013 | Roscheisen | | H01L 31/1884 |
| | | | | 257/21 |
| 2013/0048339 A1 * | 2/2013 | Tour | | H05K 1/09 |
| | | | | 174/126.1 |
| 2013/0207911 A1 * | 8/2013 | Barton | | G06F 3/0488 |
| | | | | 345/173 |
| 2013/0284497 A1 * | 10/2013 | Kajiya | | G02B 1/10 |
| | | | | 174/250 |
| 2014/0043667 A1 * | 2/2014 | Bergh | | G02F 1/153 |
| | | | | 359/265 |
| 2014/0043668 A1 * | 2/2014 | Bergh | | G02F 1/153 |
| | | | | 359/265 |
| 2014/0043669 A1 * | 2/2014 | Bergh | | G02F 1/0121 |
| | | | | 359/275 |
| 2014/0204448 A1 | 7/2014 | Bergh | | |
| 2015/0262730 A1 * | 9/2015 | Jacquemond | | H01L 51/442 |
| | | | | 174/126.2 |
| 2015/0294757 A1 * | 10/2015 | Mun | | G06F 3/041 |
| | | | | 428/337 |
| 2016/0202588 A1 * | 7/2016 | Bass | | G02F 1/155 |
| | | | | 359/265 |
| 2017/0299934 A1 * | 10/2017 | Brossard | | G02F 1/163 |
| 2019/0004386 A1 * | 1/2019 | Bergh | | G02F 1/1533 |
| 2019/0043640 A1 * | 2/2019 | Ganjoo | | C03C 17/36 |

FOREIGN PATENT DOCUMENTS

| | | |
|---|---|---|
| KR | 20140041433 | 4/2014 |
| TW | 201333611 | 8/2013 |
| WO | WO 2007-027377 | 3/2007 |
| WO | WO 2012-109494 | 8/2012 |

\* cited by examiner

ARTICLES WITH RESISTANCE GRADIENTS FOR UNIFORM SWITCHING

BACKGROUND

Smart windows are designed to reduce the amount of energy consumed for climate control of buildings and transportation vehicles by controlling the amount of solar radiation that is transmitted into such buildings and vehicles, which produces interior heating via the greenhouse effect. Currently, smart window products are usually fabricated by apply the coatings to glass.

The switching speed of current smart windows is limited by the resistance of the transparent conductive films. As the size of smart windows is increased, the switching speed of smart windows decreases proportionally. If the voltage applied to smart windows is increased to speed switching, non-uniform switching would happen, where the outer areas of the windows switch more quickly. This problem, commonly referred to as the "iris effect," is typically the result of the voltage drop along the transparent conductors from the outer to inner window areas.

SUMMARY

The current application provides an article with transparent conductive coatings, which maintains a good optical transmission and neutral color while possessing in plane electrical resistance variation, thereby reducing or eliminating the iris effect.

Thus, in one aspect, the present disclosure provides an article comprising: a transparent non-conducting layer, wherein a thickness of the transparent nonconducting layer continuously decreases in a first direction; and a transparent conducting layer on the transparent non-conducting layer, wherein a thickness of the transparent conducting layer continuously decreases in a direction opposite to the first direction; wherein a thickness of the article is substantially uniform; wherein a sheet resistance, $R_s$, to the flow of electrical current through the transparent conducting layer, varies as a function of position in the transparent conducting layer; and wherein a ratio of the value of maximum sheet resistance, $R_{max}$, to the value of minimum sheet resistance, $R_{min}$, in the transparent conducting layer is at least 1.5.

In another aspect, the present disclosure provides a device comprising: a first transparent substrate; a first transparent non-conducting layer on the first transparent substrate, wherein a thickness of the first transparent non-conducting layer continuously decreases in a first direction; and a first transparent conducting layer on the first transparent non-conducting layer, wherein a thickness of the first transparent conducting layer continuously decreases in a direction opposite to the first direction; wherein a sheet resistance, $R_s$, to the flow of electrical current through the first transparent conducting layer, varies as a function of position in the first transparent conducting layer; and wherein the ratio of the value of maximum sheet resistance, $R_{max}$, to the value of minimum sheet resistance, $R_{min}$, in the first transparent conducting layer is at least 1.5.

In another aspect, the present disclosure provides an article comprising: a first transparent conducting layer, wherein a thickness of the first transparent conducting layer continuously decreases in a first direction and the first transparent conducting layer has a first bulk resistivity; and a second transparent layer on the first transparent conducting layer, wherein a thickness of the second transparent conducting layer continuously decreases in a direction opposite to the first direction and the second transparent conducting layer has a second bulk resistivity; wherein a thickness of the article is substantially uniform; wherein the first bulk resistivity is higher than the second bulk resistivity; wherein a sheet resistance, R of the article, varies as a function of position in the transparent conducting layer; and wherein a ratio of the value of maximum sheet resistance, $R_{max}$, to the value of minimum sheet resistance, $R_{min}$ in the article is at least 1.5.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

Definitions

For the following defined terms, these definitions shall be applied for the entire Specification, including the claims, unless a different definition is provided in the claims or elsewhere in the Specification based upon a specific reference to a modification of a term used in the following definitions:

The terms "about" or "approximately" with reference to a numerical value or a shape means +/− five percent of the numerical value or property or characteristic, but also expressly includes any narrow range within the +/− five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The terms "conductive" and "resistive" refer to the electrical conductivity and electrical resistivity of a material.

The term "transparent" is used to denote substantial transmission of electromagnetic radiation through a material such that, for example, bodies situated beyond or behind the material can be distinctly seen or imaged using appropriate image sensing technology The terms "a", "an", and "the" include plural referents unless the content clearly dictates otherwise. Thus, for example, reference to a material containing "a compound" includes a mixture of two or more compounds.

BRIEF DESCRIPTION OF THE DRAWINGS

The disclosure may be more completely understood in consideration of the following detailed description of various embodiments of the disclosure in connection with the accompanying figures, in which.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Figure 1:
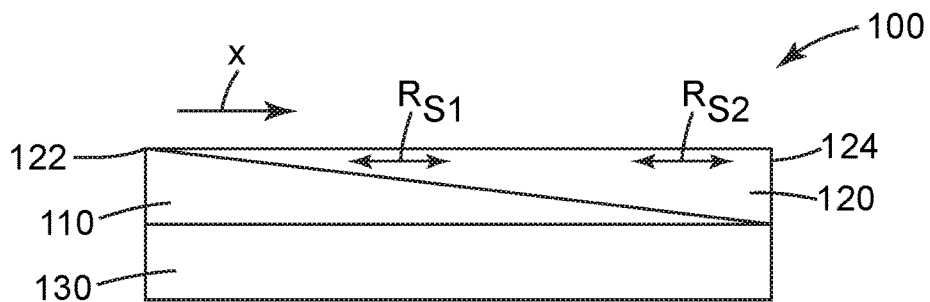
FIG. 1 is a schematic cross-section of an article according to one embodiment of the present application.

FIG. 1 depicts a cross-sectional structural diagram of an article 100 according to one embodiment of the present application. Article 100 includes a transparent non-conducting layer 110. The thickness of the transparent non-conducting layer is graded in a first direction. The thickness of the transparent non-conducting layer may or may not be linear graded along the first direction. In some embodiments, the thickness of the transparent non-conducting layer may increase or decrease exponentially or linearly. In some embodiments, the thickness of the transparent non-conducting layer may continuously decreases in x direction as illustrated in FIG. 1. In other embodiments, the thickness of the transparent non-conducting layer may continuously decrease in a direction other than x direction. A transparent conducting layer 120 is on one side of and in contact with a surface of transparent non-conducting layer 110. The thickness of the transparent conducting layer 120 may be graded in a direction opposite to the first direction. In some embodiments, the thickness of the transparent conducting layer 120 may continuously decreases in a direction opposite to x direction as illustrated in FIG. 1. Article 100 may further include a substrate 130 and transparent non-conducting layer 110 is positioned between transparent conducting layer 120 and substrate 130.

The thickness of the transparent conducting layer 120 may be graded to decrease from one edge of the transparent conducting layer 120 to the other edge opposite. The electrical resistance of the transparent conducting layer 120 is related to the thickness of transparent conducting layer 120. In some embodiment, the non-uniform sheet resistance of the transparent conducting layer 120 is the result of a thickness variation in the transparent conducting layer 120. Therefore, transparent conducting layer 120 may have a sheet resistance, $R_s$, to the flow of electrical current through the conducting layer 120 that varies as a function of position in transparent conducting layer 120. In the embodiment of FIG. 1, the sheet resistance, $R_s$, within the transparent conducting layer 120 decreases along x direction and between first edge 122 and second edge 124 of the transparent conducting layer 120. For example, the transparent conducting layer 120 has a higher sheet resistance $Rs_1$ near the first edge 122, where the transparent conducting layer has a less thickness and a lower sheet resistance $Rs_2$ near the second edge 124, where the transparent conducting layer has a more thickness.

Figure 2:
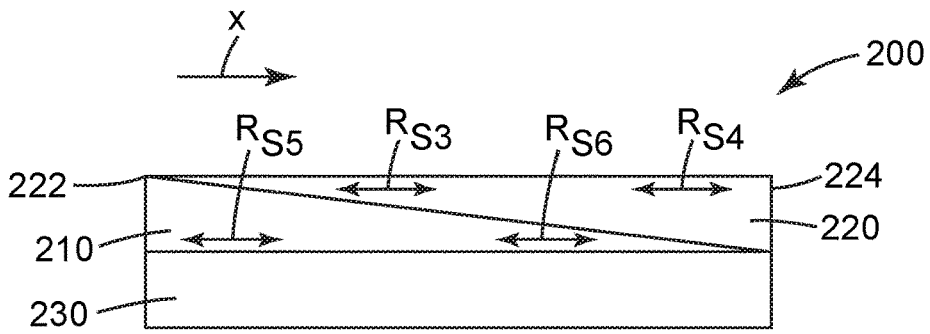
FIG. 2 is a schematic cross-section of an article according to one embodiment of the present application.

FIG. 2 depicts a cross-sectional structural diagram of an article 200 according to one embodiment of the present application. Article 200 includes a first transparent conducting layer 210. The thickness of the first transparent conducting layer is graded in a first direction. The thickness of the first transparent conducting layer may or may not be linear graded along the first direction. In some embodiments, the thickness of first transparent conducting layer may increase or decrease exponentially or linearly. In some embodiments, the thickness of the first transparent conducting layer may continuously decreases in x direction as illustrated in FIG. 2. In other embodiments, the thickness of the transparent non-conducting layer may continuously decrease in a direction other than x direction. A second transparent conducting layer 220 is on one side of and in contact with a surface of transparent non-conducting layer 210. The thickness of the second transparent conducting layer 220 may be graded in a direction opposite to the first direction. In some embodiments, the thickness of the transparent conducting layer 220 may continuously decreases in a direction opposite to x direction as illustrated in FIG. 2. Article 200 may further include a substrate 230 and the first transparent conducting layer 210 is positioned between the second transparent conducting layer 220 and substrate 230. The first transparent conducting layer 210 has a first bulk resistivity and the second transparent conducting layer 220 has a second bulk resistivity. In some embodiments, the first bulk resistivity may be higher than the second bulk resistivity. In some embodiments, the first bulk resistivity may be at least 600 µΩ·cm, 650 µΩ·cm, 700 µΩ·cm, or 750 µΩ·cm. In some embodiments, the first bulk resistivity may be from 600 to 800 µΩ·cm, from 650 to 800 µΩ·cm, from 700 to 800 µΩ·cm or from 750 to 800 µΩ·cm. In some embodiments, the second bulk resistivity may be no more than 400 µΩ·cm, 350 µΩ·cm, 300 µΩ·cm, 250 µΩ·cm, 200 µΩ·cm, 150 µΩ·cm, 100 µΩ·cm, or 75 µΩ·cm. In some embodiments, the second bulk resistivity may be from 50 to 400 µΩ·cm, from 75 to 400 µΩ·cm, or from 100 to 400 µΩ·cm, from 200 to 400 µΩ·cm, or from 300 to 400 µΩ·cm. In some embodiments, the second bulk resistivity may be higher than the first bulk resistivity.

The thickness of the first and second transparent conducting layer 210 and 220 may be graded to decrease from one edge to the other edge opposite. The electrical resistance of the first and second transparent conducting layer 210 and 220 is related to the thickness of the first and second transparent conducting layer 210 and 220. In some embodiment, the non-uniform sheet resistance of the first and second transparent conducting layer 210 and 220 is the result of a thickness variation in the first and second transparent conducting layer 210 and 220. Therefore, the first and second transparent conducting layer 210 and 220 may have a sheet resistance, $R_s$, to the flow of electrical current through the first and second transparent conducting layer 210 and 220 that varies as a function of position in the first and second transparent conducting layer 210 and 220. In the embodiment of FIG. 2, the sheet resistance, $R_s$, within the second transparent conducting layer 220 decreases along x direction and between first edge 222 and second edge 224 of the second transparent conducting layer 220. For example, the second transparent conducting layer 220 has a higher sheet resistance $Rs_3$ near the first edge 222, where the second transparent conducting layer has a less thickness and a lower sheet resistance $Rs_4$ near the second edge 224, where the second transparent conducting layer has a more thickness. In the embodiment of FIG. 2, the sheet resistance, $R_s$, within the first transparent conducting layer 210 increases along x direction. For example, the first transparent conducting layer 210 has a higher sheet resistance $Rs_6$, where the first transparent conducting layer 210 has a less thickness and a lower sheet resistance $Rs_5$, where the first transparent conducting layer has a more thickness. When the first bulk resistivity is higher than the second bulk resistivity, the first transparent conducting layer 210 has a higher sheet resistance at equal thickness than the second transparent conducting layer 220. For example, $Rs_5$ of the first transparent conducting layer 210 is higher than $Rs_4$ of the second transparent conducting layer 220 and $Rs_6$ of the first transparent conducting layer 210 is higher than $Rs_3$ of the second transparent conducting layer 220, where the first transparent conducting layer 210 has the same thickness as the second transparent conducting layer 220.

Transparent conducting layer may include any suitable material exhibiting sufficient conductivity, optical transparency and chemical stability for the intended application. Transparent conducting layer may be made from a number of different transparent materials. Such transparent materials may include those disclosed in U.S. Pat. No. 8,717,658, for example, transparent conductive oxides, thin metallic coatings, networks of conductive nano particles e.g., rods, tubes, dots)) conductive metal nitrides, and composite conductors. Transparent conductive oxides may include metal oxides and doped metallic oxide. Examples of such metal oxides and doped metallic oxide, include but are not limited to, indium oxide, indium tin oxide (ITO), tin oxide, zinc oxide, zinc aluminum oxide, zinc tin oxide, doped tin oxide, doped zinc oxide, fluorine-doped tin oxide (FTO), aluminum-doped zinc oxide, antimony-doped tin oxide, fluorine-doped indium oxide, aluminum-doped tin oxide, phosphorus-doped tin oxide, indium zinc oxide, indium gallium zinc oxide, the like and combination thereof. Conducting layer is transparent in order to enable use of the article as a transparent conductor in an electrochromic device. In some embodiments, the first and second transparent conducting layer 210 and 220 was made by the same suitable materials. For example, the first transparent conducting layer 210 may be made by using 90% indium oxide and 10% tin oxide (by weight) source and the second transparent conducting layer 210 may be made by using 92.5% indium oxide and 7.5% tin oxide (by weight) source. In other embodiments, the first and second transparent conducting layer 210 and 220 was made by the different suitable materials.

In one exemplary embodiment, the ratio of the value of maximum sheet resistance, $R_{max}$, to the value of minimum sheet resistance, $R_{min}$, in transparent conducting layer is at least about 1.5. In one exemplary embodiment, the ratio of the value of maximum sheet resistance, $R_{max}$, to the value of minimum sheet resistance, $R_{min}$, in transparent conducting layer is at least about 2. In one exemplary embodiment, the ratio of the value of maximum sheet resistance, $R_{max}$, to the value of minimum sheet resistance, $R_{min}$, in transparent conducting layer is at least about 3. In one exemplary embodiment, the ratio of the value of maximum sheet resistance, $R_{max}$, to the value of minimum sheet resistance, $R_{min}$, in transparent conducting layer is at least about 4. In one exemplary embodiment, the ratio of the value of maximum sheet resistance, $R_{max}$, to the value of minimum sheet resistance, $R_{min}$, in transparent conducting layer is at least about 5. In one exemplary embodiment, the ratio of the value of maximum sheet resistance, $R_{max}$, to the value of minimum sheet resistance, $R_{min}$, in transparent conducting layer is at least about 10.

Transparent non-conducting layer may include any material exhibiting sufficient resistivity, optical transparency, and chemical stability for the intended application. Such material may include a wide-bandgap metallic oxide with high chemical stability, magnesium oxide (MgO), yttria (Y2O3), zirconia yttria stabilized zirconia (YSZ), alumina (Al2O3), indium oxide (In2O3), titania (TiO2), nickel oxide (NiO2), halfnium oxide (HfOx), vanadium oxide (VO), strontium oxide (SrO), tungsten oxide (WO), niobium oxide (NbO), stannic oxide (SnO2) or zinc oxide (ZnO), for example. Silicon oxide and germanium oxide may also be used as transparent non-conducting layer. Non-stoichiometric oxides and mixed oxides involving two or more metals, for example, SiAl-oxynitride ($SiAlO_xN_y$), may be used for the ransparent non-conducting layer other similar transparent conductors that are less transparent than the conducting layer.

Thickness variations of transparent conducting layer and transparent non-conducting layer may be formed by vacuum deposition techniques, for example, by sputter coating as a substrate moves past the sputter cathode or evaporation source to control layer thicknesses as required. In other embodiments, thickness variations may be formed by sputter coating from a target at constant power and varying the velocity of substrate under the target as a function of position relative to the substrate. Shields can be also used to block material transport to the substrate to vary the deposited thicknesses across a substrate. Multiple sputter sources or evaporation sources can be used across the substrate as it passes with power to each source controlled to create the required thickness. A sputter source with intentional cross substrate variation of deposition due to power, magnetic field, or gas flow may be also used to create the required thickness variations.

The substrate may be transparent, in order to enable use of the article as a transparent conductor in an electrochromic device. Any material having suitable optical, electrical, thermal, and mechanical properties may be used as substrate. Such substrates include, for example, glass, polymer, metal, and metal coated glass or plastic. The substrate may comprise any suitable polymer, polycarbonate, for example. Non-exclusive examples of possible polymer substrates are polycarbonates, polyacrylics, polyurethanes, urethane carbonate copolymers, polysulfones, polyimides, polyacrates, polyethers, polyester, polyethylenes, polyalkenes, polyimides, polysulfides, polyvinylacetates and cellulose-based polymers. The substrate may comprise any suitable glass, soda lime glass, for example. Suitable glasses include either clear or tinted soda lime glass, including soda lime float glass. The glass may be tempered or untempered.

A sheet resistance, $R_s$, to the flow of electrical current through the article, may also vary as a function of position in the article. In one exemplary embodiment, the ratio of the value of maximum sheet resistance, $R_{max}$, to the value of minimum sheet resistance, $R_{min}$, in the article is at least about 1.5. In one exemplary embodiment, the ratio of the value of maximum sheet resistance, $R_{max}$, to the value of minimum sheet resistance, $R_{min}$, in the article is at least about 2. In one exemplary embodiment, the ratio of the value of maximum sheet resistance, $R_{max}$, to the value of minimum sheet resistance, $R_{min}$, in the article is at least about 3. In one exemplary embodiment, the ratio of the value of maximum sheet resistance, $R_{max}$, to the value of minimum sheet resistance, $R_{min}$, in the article is at least about 4. In one exemplary embodiment, the ratio of the value of maximum sheet resistance, $R_{max}$, to the value of minimum sheet resistance, $R_{min}$, in the article is at least about 5. In one exemplary embodiment, the ratio of the value of maximum sheet resistance, $R_{max}$, to the value of minimum sheet resistance, $R_{min}$, in the article is at least about 10.

The article may be transmissive to electromagnetic radiation having a wavelength in the range of infrared to ultraviolet. For example, in one embodiment, the article is transparent to electromagnetic radiation having a wavelength from 300 to 5000 nm. In one exemplary embodiment, the visible light transmission of the article may be more than 40%. In one exemplary embodiment, the visible light transmission of the article may be more than 50%. In one exemplary embodiment, the visible light transmission of the article may be more than 60%. In one exemplary embodiment, the visible light transmission of the article may be more than 70%.

The article has a range of electrical resistance by varying the thickness of transparent conducting layer, while maintaining good and substantially uniform optical transmission. In the embodiment of FIG. 1, the thickness of the transparent non-conducting layer is graded in a first direction and the thickness of the transparent conducting layer is graded in a direction opposite to the first direction. For example, the thickness of the transparent non-conducting layer 110 continuously decrease in x direction and the thickness of the transparent non-conducting layer 110 continuously increase in x direction to provide an article with an index matched, substantially uniform optics. In some embodiments, the visible light transmission of the article varies less than 20% in a direction, for example, x direction or a direction perpendicular to x direction. In some embodiments, the visible light transmission of the article varies less than 15% in a direction. In some embodiments, the visible light transmission of the article varies less than 10% in a direction. In some embodiments, the visible light transmission of the article varies less than 5% in a direction. In other embodiments, the reflectance of the article varies less than 10% in a direction, for example, x direction or a direction perpendicular to x direction. Optical properties of the articles may be substantially homogeneous due to the substantially uniform thickness of the article and index match.

Figure 3:
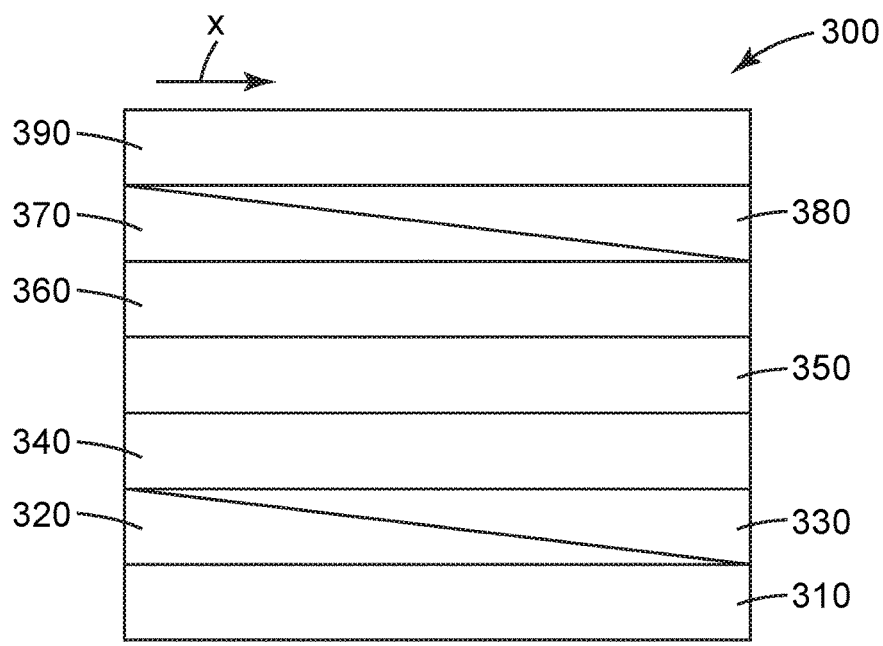
FIG. 3 is a schematic cross-section of an device according to one embodiment of the present application.

FIG. 3 depicts a cross-sectional structural diagram of a device 300 according to one embodiment of the present application. Device 300 includes a first transparent substrate 310 and a first non-conducting layer 320 on the first transparent substrate 310. The thickness of the first transparent non-conducting layer 320 is graded in a first direction. A first transparent conducting layer 330 is on one side of and in contact with a surface of first transparent conducting layer 320. The thickness of the first transparent conducting layer 330 is graded in a direction opposite to the first direction. In some embodiments, the thickness of the first transparent non-conducting layer 320 may continuously decreases in x direction as illustrated in FIG. 3. In some embodiments, the thickness of the first transparent conducting layer 330 may continuously decreases in a direction opposite to x direction as illustrated in FIG. 3. Device 300 may further include a second transparent conducting layer 370, the first transparent conducting layer 330 being located between the first transparent non-conducting layer 320 and the second transparent conducting layer 370. A second transparent non-conducting layer 380 is on the second transparent conducting layer 370. A second substrate 390 is on the second transparent non-conducting layer 380. The thickness of the second transparent non-conducting layer 380 is graded in a second direction and the thickness of the second transparent conducting layer 370 is graded in a direction opposite to the second direction. In some embodiments, the thickness of the second transparent non-conducting layer 380 may continuously decreases in a direction opposite to x direction as illustrated in FIG. 3. In these embodiments, the thickness of the second transparent conducting layer 370 may continuously decreases in x direction as illustrated in FIG. 2. Device 300 may further include a first electrode layer 340 on a surface of the first transparent conducting layer 330, the first transparent conducting layer 330 being between the first electrode layer 340 and first transparent non-conducting layer 320. In some embodiments, the thickness of the first transparent conducting layer 330 continuously increase in x direction and the thickness of the second conducting layer 370 continuously decrease in x direction, as illustrated in FIG. 3. In this way, the device 300 may provide a substantially uniform switch with the thickness of the fist and second transparent conducting layer graded in the opposite direction. Device 300 may further include an ion conducting layer 350 and a second electrode layer 360, ion conducting layer 350 being between the first electrode layer 340 and second electrode layer 360.

In one embodiment, first electrode layer 340 may contains any one or more of a number of different electrochromic materials. Second electrode layer 360 serves as the counter electrode to first electrode layer 340 and, like first electrode layer 340, second electrode layer 360 may comprise electrochromic materials as well as non-electrochromic materials. Non-exclusive examples of second electrode layer 360 may include those disclosed in U.S. Pat. No. 8,717,658, for example, cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films, e.g., of oxides based on vanadium and/or cerium as well as activated carbon, or combinations thereof.

The thickness of the first electrode layer 340 and second electrode layer 360 may depend on the electrochromic material selected for the electrochromic layer. In some embodiments, first electrode layer 340 and second electrode layer 360 are from 50 nm to 2,000 nm, or from 100 nm to 700 nm.

Ion conducting layer 350 may include an ion conductor material and ion conducting layer 350 may be highly conductive to the relevant ions for the first and second electrode layers 340 and 360. Such ions may include those disclosed in U.S. Pat. No. 8,717,658, for example, lithium ions ($Li^+$) and hydrogen ions ($H^+$) (i.e., protons), deuterium ions ($D^+$), sodium ions ($Na^+$), potassium ions ($K^+$), calcium ions ($Ca^{++}$), barium ions ($Ba^{++}$), strontium ions ($Sr^{-+}$), and magnesium ions ($Mg^{++}$). The thickness of the ion conducting layer 350 may depend on the ion conductor material used. In some embodiments using an inorganic ion conductor, the thickness of the ion conducting layer 350 may be from 1 nm to 250 nm to thick. In other embodiments using an organic ion conductor, the thickness of the ion conducting layer 350 may be from 1000 nm to 100000 nm. The thickness of the ion conducting layer may be substantially uniform.

The device 300 may be transmissive to electromagnetic radiation having a wavelength in the range of infrared to ultraviolet. For example, in one embodiment, the device 300 is transparent to electromagnetic radiation having a wavelength from 300 to 5000 nm. In one exemplary embodiment, the visible light transmission of the device may be more than 40%. In one exemplary embodiment, the visible light transmission of the device may be more than 50%. In one exemplary embodiment, the visible light transmission of the device may be more than 60%. In one exemplary embodiment, the visible light transmission of the device may be more than 70%.

The device 300 displays reduced or eliminated iris effect, while maintaining good optical transmission. In some embodiments, the visible light transmission of the device varies less than 20% in a direction, for example, x direction or a direction perpendicular to x direction. In some embodiments, the visible light transmission of the device varies less than 15% in a direction. In some embodiments, the visible light transmission of the device varies less than 10% in a direction. In some embodiments, the visible light transmission of the device varies less than 5% in a direction. In other embodiments, the reflectance of the device varies less than 10% in a direction, for example, x direction or a direction perpendicular to x direction.

The following embodiments are intended to be illustrative of the present disclosure and not limiting.

EMBODIMENTS

1. An article comprising:
    a transparent non-conducting layer, wherein a thickness of the transparent non-conducting layer continuously decreases in a first direction; and
    a transparent conducting layer on the transparent non-conducting layer, wherein a thickness of the transparent conducting layer continuously decreases in a direction opposite to the first direction;
    wherein a thickness of the article is substantially uniform;
    wherein a sheet resistance, $R_s$, to the flow of electrical current through the transparent conducting layer, varies as a function of position in the transparent conducting layer; and
    wherein a ratio of the value of maximum sheet resistance, $R_{max}$, to the value of minimum sheet resistance, $R_{min}$, in the transparent conducting layer is at least 1.5.
2. The article of embodiment 1, wherein the ratio of the value of maximum sheet resistance, $R_{max}$, to the value of minimum sheet resistance, $R_{min}$, in the transparent conducting layer is at least 5.
3. The article of any one of embodiments 1 to 2, wherein the article is transparent to electromagnetic radiation having a wavelength from 300 to 5000 nm.
4. The article of any one of embodiments 1 to 3, wherein the visible light transmission of the article is more than 40%.
5. The article of any one of embodiments 1 to 4, wherein the visible light transmission of the article varies less than 10% in the first direction or a direction perpendicular to the first direction.
6. The article of any one of embodiments 1 to 5, wherein the visible light transmission of the article varies less than 5% in the first direction or a direction perpendicular to the first direction.
7. The article of any one of embodiments 1 to 6, wherein the reflectance of the article varies less than 4% in the first direction or a direction perpendicular to the first direction.
8. The article of any one of embodiments 1 to 7, further comprising a substrate.
9. A device comprising:
    a first transparent substrate;
    a first transparent non-conducting layer on the first transparent substrate, wherein a thickness of the first transparent non-conducting layer continuously decreases in a first direction; and
    a first transparent conducting layer on the first transparent non-conducting layer, wherein a thickness of the first transparent conducting layer continuously decreases in a direction opposite to the first direction;
    wherein a sheet resistance, $R_s$, to the flow of electrical current through the first transparent conducting layer, varies as a function of position in the first transparent conducting layer; and
    wherein the ratio of the value of maximum sheet resistance, $R_{max}$, to the value of minimum sheet resistance, $R_{min}$, in the first transparent conducting layer is at least 1.5.
10. The device of embodiment 9, further comprising
    a second transparent conducting layer, the first transparent conducting layer being located between the first transparent non-conducting layer and the second transparent conducting layer; and
    a second transparent non-conducting layer on second transparent conducting layer;
    wherein a thickness of the second transparent nonconducting layer continuously decreases in a second direction and a thickness of the first transparent conducting layer continuously decreases in a direction opposite to the second direction;
    wherein a sheet resistance, $R_s$, to the flow of electrical current through the second transparent conducting layer, varies as a function of position in the second transparent conducting layer; and wherein the ratio of the value of maximum sheet resistance, $R_{max}$, to the value of minimum sheet resistance, $R_{min}$, in the second transparent conducting layer is at least 1.5.

11. The device of embodiment 10, further comprising a second substrate, the second transparent non-conducting layer being between the second substrate and the second transparent conducting layer.

12. The device of embodiments 9 to 11, wherein the device is transparent to electromagnetic radiation having a wavelength from 300 to 5000 nm.

13. The device of embodiments 9 to 12, wherein the visible light transmission of the device is more than 40%.

14. The device of any one of embodiments 9 to 13, wherein the visible light transmission of the device varies less than 10% in the first direction or a direction perpendicular to the first direction.

15. The device of any one of embodiments 9 to 14, wherein the visible light transmission of the device varies less than 5% in the first direction or a direction perpendicular to the first direction.

16. The device of any one of embodiments 9 to 15, wherein the ratio of the value of maximum sheet resistance, $R_{max}$, to the value of minimum sheet resistance, $R_{min}$, in the first transparent conducting layer is at least 5.

17. The device of any one of embodiments 9 to 16, wherein the reflectance of the device varies less than 4% in the first direction or a direction perpendicular to the first direction.

18. An article comprising:
a first transparent conducting layer, wherein a thickness of the first transparent conducting layer continuously decreases in a first direction and the first transparent conducting layer has a first bulk resistivity; and
a second transparent layer on the first transparent conducting layer, wherein a thickness of the second transparent conducting layer continuously decreases in a direction opposite to the first direction and the second transparent conducting layer has a second bulk resistivity;
wherein a thickness of the article is substantially uniform;
wherein the first bulk resistivity is higher than the second bulk resistivity;
wherein a sheet resistance, $R_s$ of the article, varies as a function of position in the transparent conducting layer; and
wherein a ratio of the value of maximum sheet resistance, $R_{max}$, to the value of minimum sheet resistance, $R_{min}$ in the article is at least 1.5.

19. The article of embodiment 18, wherein the first bulk resistivity is from 600 to 800 μΩ·cm.

20. The article of any one of embodiments 18 to 19, wherein the second bulk resistivity is from 50 to 400 μΩ·cm.

21. The article of any one of embodiments 18 to 20, wherein the visible light transmission of the article varies less than 10% in the first direction or a direction perpendicular to the first direction.

22. The article of any one of embodiments 18 to 21, wherein the visible light transmission of the article varies less than 5% in the first direction or a direction perpendicular to the first direction.

23. An article comprising:
a first transparent conducting layer, wherein a resistance of the first transparent conducting layer is graded in a first direction and the first transparent conducting layer has a first bulk resistivity; and
a second transparent layer on the first transparent conducting layer, wherein a sheet resistance of the second transparent conducting layer is graded in a direction opposite to the first direction and the second transparent conducting layer has a second bulk resistivity;
wherein a thickness of the article is substantially uniform;
wherein the first bulk resistivity is higher than the second bulk resistivity;
wherein a sheet resistance, $R_s$ of the article, varies as a function of position in the transparent conducting layer; and
wherein a ratio of the value of maximum sheet resistance, $R_{max}$, to the value of minimum sheet resistance, $R_{min}$ in the article is at least 1.5.

The following working examples are intended to be illustrative of the present disclosure and not limiting.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, Wis.) unless otherwise noted. In addition, Table 1 provides abbreviations and a source for all materials used in the Examples below:

TABLE 1

Materials.

| Abbreviation or Tradename | Description | Source |
| --- | --- | --- |
| Melinex ST505 | Polyethylene terephthalate (PET) film, 0.127 mm thick and 355.6 mm wide | Dupont Teijin Films US, L.P. (Chester, VA) |
| SiAl source | 90% Silicon 10% Aluminum sputtering target 559 mm × 102 mm × 9.5 mm | DHF Technical Products (Commerce, CA) |
| ITO source | 92.5% Indium Oxide 7.5% Tin Oxide (ITO) sputter target 559 mm × 89 mm × 9.5 mm | Umicore Indium Products (Providence, RI) |

TABLE 1-continued

Materials.

| Abbreviation or Tradename | Description | Source |
|---|---|---|
| ITO source | 90% Indium Oxide 10% Tin Oxide (ITO) sputter target 559 mm × 89 mm × 9.5 mm | Umicore Indium Products (Providence, RI) |

Methods
Measurement of Sheet Resistance

A Delcom 717 conductance monitor (Delcom Instruments, Minneapolis, Minn.) was used to measure sheet resistance. Samples were measured after a manual zero operation with the instrument set in low conductance mode with no sample loaded. The sample was then loaded and the resistance was recorded as a function of position.

Color Measurement

Color measurements were made using an Ultrascan PRO spectrophotometer (available from Hunter Associates Laboratory, Reston, Va., USA). D65 illuminant and 10° observer were used for calculating the color coordinates.

Optical Transmission

The light transmitted was measured and reported as a percentage using either a Lambda 950 spectrophotometer from PerkinElmer (Altham, Mass.) or an UltraScan PRO spectrophotometer (available from Hunter Associates Laboratory, Reston, Va., USA).

Example 1

An insulating optical layer of silicon-aluminum oxynitride was created on a polyethylene terephthalate (PET) substrate. The PET (Melinex 505) was loaded into a roll to roll vacuum chamber and wound around a process drum. The process drum was maintained at a controlled temperature of 160° F. during deposition. The pressure in the vacuum chamber was reduced to $3 \times 10^{-5}$ Torr (0.004 Pa). Argon with 2% hydrogen was introduced into the chamber at 350 sccm near the 90% silicon 10% aluminum (by weight) source, along with oxygen at 18.2 sccm and nitrogen totaling 1040 sccm from three locations, producing a pressure of about 0.006 Torr (0.799 Pa) and powered to 5 kW, 600 V and 9.16 A for reactive deposition of silicon-aluminum-oxynitride. The silicon-aluminum source contained a matched set of targets on cathodes powered with a mid-frequency AC power supply from Advanced Energy (Fort Collins, Colo.). The cathodes were masked with a shaped mask made from a standard commercial aluminum sheet in which a triangular area was cut out. The shaped mask shadowed more of the cathode on one side and less on the other to create variation in deposited material thickness across the sample. The web was slowed and then reversed over the sample for a total of 3 coating passes through the vacuum chamber at a web speed of about 1 m/min. The power and gas flows were then turned off and the pressure in the vacuum chamber was again reduced to $3 \times 10^{-5}$ Torr. Argon gas with 2% hydrogen at a flow rate of 85 sccm was introduced into the vacuum chamber through the ITO source along with oxygen at 3.5 sccm, producing a pressure of about 0.003 Torr (0.399 Pa) and powered to 3 kW, 268 V and 11 A for a DC sputtered deposition of ITO (powered by an Advanced Energy Pinnacle Plus power supply, Fort Collins, Colo.). The cathode was also masked with a shaped mask, with a triangular cutout to shadow or block part of the cathode on one side and leave it relatively more exposed on the other side for a variation in material thickness deposited across the sample. The web was reversed and passed through the coating zone for 1 coating pass through the vacuum chamber at a web speed of about 0.48 m/min.

The measured sample resistance data shown in Table 2 was obtained using the method described in Measurement of Sheet Resistance. "Position" refers to the cross-web location in inches from the edge of the film. The measured color data was obtain as described in Color Measurement and is also provided in Table 2. The measured optical transmission data was obtained as described in Optical Transmission and is provided in Table 3. The average value of the percentage of light transmitted from 400 nm to 700 nm provided in Table 2 was calculated using the data from Table 3.

TABLE 2

Calculated and measured values at various positions on the substrate.

| Position | Sheet Resistance (OHM/sq) | Avg % T | L* | a* | b* |
|---|---|---|---|---|---|
| 2 | 69.15 | 80.12 | 92.24 | −1.85 | −0.44 |
| 3 | 62.71 | 80.66 | 92.93 | −2.76 | 1.47 |
| 4 | 66 | 80.73 | 92.96 | −2.8 | 1.25 |
| 5 | 72.35 | 80.82 | 92.77 | −2.42 | 0.07 |
| 6 | 103.9 | 80.20 | 92.05 | −1.4 | −1.51 |
| 7 | 90.08 | 79.23 | 91.28 | −0.34 | −1.68 |
| 8 | 78.3 | 78.45 | 90.93 | 0.13 | −0.27 |
| 9 | 94.07 | 78.55 | 91.1 | 0.08 | 0.76 |
| 10 | 131 | 79.37 | 91.57 | −0.16 | 0.99 |
| 11 | 240.3 | 80.71 | 92.08 | 0.09 | 0.78 |
| 12 | 869 | 82.06 | 92.67 | 0.18 | 0.9 |

TABLE 3

The percentage of light transmitted as a function of wavelength and position.

| Wavelength (nm) | Position (inches) | | | | | | | | | | |
|---|---|---|---|---|---|---|---|---|---|---|---|
| | 2 | 3 | 4 | 5 | 6 | 7 | 8 | 9 | 10 | 11 | 12 |
| 400 | 69.46 | 64.92 | 65.11 | 67.22 | 71.7 | 75.46 | 74.75 | 73.15 | 73.11 | 76.08 | 78.43 |
| 405 | 71.85 | 67.4 | 67.67 | 69.82 | 74.03 | 76.98 | 75.76 | 74.09 | 74.11 | 76.85 | 78.97 |
| 410 | 73.96 | 69.76 | 70.04 | 72.16 | 76.03 | 78.22 | 76.56 | 74.91 | 75 | 77.52 | 79.35 |
| 415 | 75.8 | 71.99 | 72.29 | 74.35 | 77.79 | 79.24 | 77.17 | 75.56 | 75.77 | 78.02 | 79.68 |
| 420 | 77.33 | 73.89 | 74.2 | 76.27 | 79.25 | 80.01 | 77.63 | 76.09 | 76.4 | 78.42 | 79.98 |

TABLE 3-continued

The percentage of light transmitted as a function of wavelength and position.

| Wavelength (nm) | Position (inches) | | | | | | | | | | |
|---|---|---|---|---|---|---|---|---|---|---|---|
| | 2 | 3 | 4 | 5 | 6 | 7 | 8 | 9 | 10 | 11 | 12 |
| 425 | 78.7 | 75.66 | 76.03 | 77.97 | 80.51 | 80.74 | 78.11 | 76.64 | 77.02 | 78.89 | 80.31 |
| 430 | 79.87 | 77.3 | 77.65 | 79.48 | 81.59 | 81.21 | 78.43 | 77.03 | 77.46 | 79.25 | 80.53 |
| 435 | 80.85 | 78.71 | 79.09 | 80.78 | 82.36 | 81.53 | 78.68 | 77.35 | 77.89 | 79.49 | 80.7 |
| 440 | 81.6 | 79.91 | 80.28 | 81.82 | 82.95 | 81.72 | 78.85 | 77.63 | 78.24 | 79.71 | 80.87 |
| 445 | 82.22 | 80.97 | 81.33 | 82.71 | 83.41 | 81.84 | 78.95 | 77.85 | 78.54 | 79.93 | 81.01 |
| 450 | 82.7 | 81.84 | 82.2 | 83.41 | 83.74 | 81.86 | 79.02 | 78.03 | 78.79 | 80.12 | 81.13 |
| 455 | 83.06 | 82.55 | 82.9 | 83.95 | 83.92 | 81.83 | 79.02 | 78.14 | 78.98 | 80.25 | 81.23 |
| 460 | 83.35 | 83.16 | 83.52 | 84.37 | 84.03 | 81.76 | 79.01 | 78.23 | 79.13 | 80.31 | 81.32 |
| 465 | 83.55 | 83.65 | 84 | 84.72 | 84.11 | 81.66 | 79.01 | 78.32 | 79.27 | 80.39 | 81.42 |
| 470 | 83.66 | 84.06 | 84.37 | 84.98 | 84.12 | 81.58 | 79.01 | 78.41 | 79.42 | 80.5 | 81.51 |
| 475 | 83.72 | 84.38 | 84.66 | 85.13 | 84.05 | 81.44 | 78.96 | 78.5 | 79.51 | 80.61 | 81.59 |
| 480 | 83.63 | 84.46 | 84.74 | 85 | 83.76 | 81.08 | 78.74 | 78.38 | 79.41 | 80.46 | 81.5 |
| 485 | 83.61 | 84.65 | 84.89 | 85.06 | 83.6 | 80.94 | 78.74 | 78.45 | 79.52 | 80.5 | 81.61 |
| 490 | 83.57 | 84.78 | 85.02 | 85.06 | 83.45 | 80.81 | 78.7 | 78.49 | 79.61 | 80.59 | 81.7 |
| 495 | 83.44 | 84.83 | 85.09 | 85.01 | 83.31 | 80.68 | 78.69 | 78.5 | 79.66 | 80.63 | 81.76 |
| 500 | 83.26 | 84.73 | 84.97 | 84.76 | 83 | 80.38 | 78.56 | 78.46 | 79.6 | 80.57 | 81.7 |
| 505 | 83.07 | 84.64 | 84.82 | 84.56 | 82.71 | 80.18 | 78.42 | 78.43 | 79.58 | 80.52 | 81.73 |
| 510 | 82.92 | 84.56 | 84.71 | 84.41 | 82.47 | 80 | 78.34 | 78.46 | 79.59 | 80.58 | 81.78 |
| 515 | 82.75 | 84.42 | 84.56 | 84.21 | 82.21 | 79.8 | 78.3 | 78.46 | 79.61 | 80.57 | 81.79 |
| 520 | 82.51 | 84.27 | 84.39 | 83.96 | 82 | 79.61 | 78.26 | 78.45 | 79.6 | 80.6 | 81.83 |
| 525 | 82.26 | 84.08 | 84.17 | 83.69 | 81.69 | 79.41 | 78.16 | 78.4 | 79.56 | 80.55 | 81.79 |
| 530 | 82.12 | 83.97 | 84.06 | 83.52 | 81.53 | 79.36 | 78.2 | 78.48 | 79.63 | 80.67 | 81.94 |
| 535 | 81.95 | 83.83 | 83.92 | 83.33 | 81.35 | 79.25 | 78.22 | 78.57 | 79.68 | 80.76 | 82.08 |
| 540 | 81.7 | 83.57 | 83.62 | 83.03 | 81.04 | 79.03 | 78.13 | 78.51 | 79.63 | 80.72 | 82.01 |
| 545 | 81.55 | 83.42 | 83.47 | 82.87 | 80.91 | 78.99 | 78.18 | 78.62 | 79.73 | 80.85 | 82.16 |
| 550 | 81.31 | 83.17 | 83.22 | 82.6 | 80.7 | 78.83 | 78.16 | 78.64 | 79.73 | 80.83 | 82.2 |
| 555 | 81.11 | 82.97 | 82.98 | 82.37 | 80.48 | 78.74 | 78.15 | 78.65 | 79.74 | 80.86 | 82.22 |
| 560 | 80.92 | 82.78 | 82.78 | 82.14 | 80.31 | 78.65 | 78.16 | 78.69 | 79.74 | 80.9 | 82.29 |
| 565 | 80.74 | 82.56 | 82.55 | 81.91 | 80.11 | 78.55 | 78.18 | 78.72 | 79.79 | 80.93 | 82.36 |
| 570 | 80.6 | 82.39 | 82.35 | 81.72 | 79.99 | 78.48 | 78.19 | 78.79 | 79.85 | 81 | 82.41 |
| 575 | 80.4 | 82.19 | 82.17 | 81.52 | 79.83 | 78.43 | 78.18 | 78.82 | 79.85 | 81.05 | 82.44 |
| 580 | 80.23 | 82 | 81.98 | 81.33 | 79.67 | 78.37 | 78.21 | 78.87 | 79.9 | 81.11 | 82.53 |
| 585 | 80.02 | 81.74 | 81.77 | 81.07 | 79.46 | 78.28 | 78.21 | 78.91 | 79.9 | 81.12 | 82.56 |
| 590 | 79.88 | 81.57 | 81.54 | 80.9 | 79.33 | 78.27 | 78.24 | 78.96 | 79.94 | 81.17 | 82.63 |
| 595 | 79.75 | 81.39 | 81.36 | 80.74 | 79.23 | 78.22 | 78.32 | 79.02 | 79.99 | 81.23 | 82.7 |
| 600 | 79.67 | 81.22 | 81.19 | 80.58 | 79.12 | 78.19 | 78.37 | 79.09 | 80.05 | 81.34 | 82.78 |
| 605 | 79.51 | 81.02 | 80.98 | 80.42 | 79 | 78.14 | 78.38 | 79.16 | 80.07 | 81.38 | 82.81 |
| 610 | 79.35 | 80.86 | 80.75 | 80.24 | 78.89 | 78.08 | 78.37 | 79.25 | 80.11 | 81.39 | 82.86 |
| 615 | 79.21 | 80.71 | 80.6 | 80.07 | 78.76 | 78.04 | 78.42 | 79.28 | 80.15 | 81.41 | 82.9 |
| 620 | 79.04 | 80.5 | 80.39 | 79.88 | 78.67 | 78.02 | 78.5 | 79.28 | 80.17 | 81.44 | 82.93 |
| 625 | 78.92 | 80.33 | 80.21 | 79.72 | 78.54 | 77.99 | 78.53 | 79.34 | 80.2 | 81.49 | 82.95 |
| 630 | 78.86 | 80.23 | 80.13 | 79.63 | 78.5 | 78.03 | 78.63 | 79.46 | 80.28 | 81.6 | 83.05 |
| 635 | 78.81 | 80.12 | 79.95 | 79.5 | 78.46 | 78.05 | 78.69 | 79.52 | 80.36 | 81.66 | 83.11 |
| 640 | 78.69 | 79.95 | 79.77 | 79.35 | 78.35 | 78.04 | 78.71 | 79.57 | 80.38 | 81.68 | 83.15 |
| 645 | 78.6 | 79.81 | 79.61 | 79.23 | 78.3 | 78.03 | 78.76 | 79.64 | 80.37 | 81.74 | 83.17 |
| 650 | 78.55 | 79.77 | 79.56 | 79.17 | 78.25 | 78.07 | 78.86 | 79.74 | 80.45 | 81.81 | 83.24 |
| 655 | 78.46 | 79.66 | 79.51 | 79.1 | 78.21 | 78.12 | 78.93 | 79.77 | 80.53 | 81.85 | 83.3 |
| 660 | 78.43 | 79.53 | 79.4 | 79.01 | 78.19 | 78.14 | 78.99 | 79.84 | 80.56 | 81.87 | 83.35 |
| 665 | 78.38 | 79.45 | 79.32 | 78.93 | 78.14 | 78.15 | 79.03 | 79.94 | 80.61 | 81.98 | 83.4 |
| 670 | 78.33 | 79.31 | 79.18 | 78.86 | 78.16 | 78.19 | 79.1 | 80.02 | 80.65 | 82.03 | 83.47 |
| 675 | 78.31 | 79.21 | 79.11 | 78.84 | 78.13 | 78.23 | 79.22 | 80.09 | 80.73 | 82.08 | 83.52 |
| 680 | 78.27 | 79.17 | 79 | 78.79 | 78.12 | 78.26 | 79.31 | 80.16 | 80.8 | 82.1 | 83.53 |
| 685 | 78.26 | 79.14 | 78.99 | 78.73 | 78.15 | 78.34 | 79.4 | 80.31 | 80.84 | 82.19 | 83.62 |
| 90 | 78.28 | 79.11 | 78.98 | 78.72 | 78.17 | 78.43 | 79.55 | 80.4 | 80.94 | 82.34 | 83.71 |
| 695 | 78.32 | 79.08 | 78.94 | 78.72 | 78.25 | 78.56 | 79.64 | 80.48 | 81.05 | 82.41 | 83.77 |
| 700 | 78.26 | 79.04 | 78.9 | 78.73 | 78.28 | 78.56 | 79.69 | 80.59 | 81.1 | 82.44 | 83.83 |

Example 2

A transparent conductor of indium tin oxide (ITO) was created on a polyethylene terephthalate (PET) substrate. The PET (Melinex 505) was loaded into a roll to roll vacuum chamber and wound around a process drum. The process drum was maintained at a controlled temperature of 160° F. during deposition. The pressure in the vacuum chamber was reduced to $3 \times 10^{-5}$ Torr (0.004 Pa). Argon with 2% hydrogen was introduced into the chamber at 85 sccm near the 90% indium oxide 10% tin oxide (by weight) source along with oxygen at 9 sccm for a total of 94 sccm, producing a pressure of about 0.003 Torr (0.799 Pa) and powered to 3 kW, 268 V and 11 A. The ITO source contained a single target on a cathode powered by an Advanced Energy Pinnacle Plus power supply (Fort Collins, Colo.). The cathode was masked with a standard commercial aluminum sheet that was rolled to the diameter of the coating drum and had a triangular cutout to shadow part of the cathode on one side and leave it open on the other side to create variation in deposited material thickness across the sample. The web was passed through the coating zone for 1 coating pass through the vacuum chamber at a web speed of about 0.6 m/min. The power and gas flows were then turned off and the chamber was vented, the target material was changed to one having 92.5% indium oxide and 7.5% tin oxide, and the mask was rotated 180 degrees to reverse the thickness gradient. The pressure in the vacuum chamber was again reduced to 3×10$^{-5}$ Torr (0.00399 Pa). Argon gas with 2% hydrogen at a flow rate of 85 sccm was introduced into the vacuum chamber through the ITO source along with oxygen at 6 sccm producing a pressure of about 0.0035 Torr (0.399 Pa) and powered to 3 kW, 245 V and 12.46 A for a DC sputtered deposition of ITO powered by an Advanced Energy Pinnacle Plus power supply (Fort Collins, Colo.). The web was reversed and passed through the coating zone for 1 coating pass through the vacuum chamber at a web speed of about 0.48 m/min to create a layer with a thickness gradient.

The measured sample resistance data shown in Table 4 was obtained using the method described in Measurement of Sheet Resistance. "Position" refers to the cross-web location in inches from the edge of the film. The measured color data was obtained as described in Color Measurement and is also provided in Table 4. The measured optical transmission data was obtained as described in Optical Transmission and is provided in Table 5. The average value of the percentage of light transmitted from 400 nm to 700 nm provided in Table 4 was calculated using the data from Table 5.

TABLE 4

Calculated and measured values at various positions on the substrate.

| Position | Sheet Resistance (OHM/sq) | Avg % T | L* | a* | b* |
|---|---|---|---|---|---|
| 1 | 57.1 | 77.78705 | 56.34 | −2.52 | 9.11 |
| 2 | 53.7 | 78.04525 | 55.86 | −2.1 | 11.92 |
| 3 | 52.6 | 79.22852 | 54.27 | −0.91 | 13.78 |
| 4 | 53.4 | 80.50393 | 52.61 | 0.8 | 13.66 |
| 5 | 55.5 | 81.45787 | 50.69 | 3.01 | 11.15 |
| 6 | 59.8 | 81.94705 | 49.47 | 4.84 | 7.46 |
| 7 | 66.2 | 82.31836 | 47.94 | 7 | 1.89 |
| 8 | 74 | 82.35033 | 47.08 | 8.06 | −3.71 |
| 9 | 82.6 | 82.35656 | 46.28 | 8.82 | −8.22 |
| 10 | 90.9 | 82.21164 | 46.26 | 8.39 | −10.89 |
| 11 | 99 | 82.16951 | 46.16 | 7.62 | −13.31 |
| 12 | 117 | 80.94328 | 46.46 | 7.37 | −12.68 |

TABLE 5

The percentage of light transmitted as a function of wavelength and position.

| Wavelength (nm) | Position (inches) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 400 | 74.96 | 74.53 | 73.32 | 70.93 | 67.94 | 64.73 | 62.3 | 60.13 | 58.63 | 57.93 | 57.61 | 58.02 |
| 405 | 76.46 | 76.34 | 75.68 | 73.66 | 70.88 | 67.56 | 65 | 62.65 | 61.02 | 60.07 | 59.61 | 60.13 |
| 410 | 77.61 | 77.76 | 77.61 | 75.98 | 73.54 | 70.34 | 67.67 | 65.09 | 63.27 | 62.17 | 61.55 | 62.14 |
| 415 | 78.4 | 78.88 | 79.14 | 78.08 | 75.95 | 72.92 | 70.28 | 67.47 | 65.54 | 64.23 | 63.5 | 64.02 |
| 420 | 79 | 79.71 | 80.41 | 79.85 | 78.04 | 75.25 | 72.68 | 69.74 | 67.71 | 66.25 | 65.44 | 65.9 |
| 425 | 79.68 | 80.59 | 81.73 | 81.53 | 80.13 | 77.56 | 75.1 | 72.09 | 69.96 | 68.38 | 67.52 | 67.92 |
| 430 | 79.88 | 80.99 | 82.5 | 82.73 | 81.74 | 79.49 | 77.18 | 74.2 | 72.01 | 70.32 | 69.37 | 69.76 |
| 435 | 79.96 | 81.23 | 83 | 83.67 | 83.11 | 81.18 | 79.03 | 76.14 | 73.97 | 72.13 | 71.15 | 71.53 |
| 440 | 80 | 81.36 | 83.32 | 84.36 | 84.2 | 82.59 | 80.68 | 77.88 | 75.79 | 73.87 | 72.83 | 73.21 |
| 445 | 79.97 | 81.36 | 83.49 | 84.82 | 85.04 | 83.77 | 82.19 | 79.47 | 77.47 | 75.58 | 74.46 | 74.81 |
| 450 | 79.96 | 81.35 | 83.63 | 85.22 | 85.75 | 84.85 | 83.49 | 80.97 | 79.05 | 77.15 | 76.05 | 76.37 |
| 455 | 79.82 | 81.19 | 83.57 | 85.41 | 86.22 | 85.68 | 84.53 | 82.25 | 80.47 | 78.6 | 77.5 | 77.74 |
| 460 | 79.55 | 80.88 | 83.33 | 85.39 | 86.45 | 86.2 | 85.33 | 83.31 | 81.66 | 79.83 | 78.76 | 78.94 |
| 465 | 79.38 | 80.68 | 83.19 | 85.36 | 86.7 | 86.7 | 86.1 | 84.32 | 82.78 | 81.06 | 80.05 | 80.18 |
| 470 | 79.32 | 80.55 | 83.12 | 85.37 | 86.86 | 87.19 | 86.78 | 85.27 | 83.9 | 82.23 | 81.29 | 81.39 |
| 475 | 79.25 | 80.43 | 82.97 | 85.3 | 86.96 | 87.52 | 87.36 | 86.04 | 84.91 | 83.34 | 82.44 | 82.55 |
| 480 | 78.71 | 79.83 | 82.32 | 84.72 | 86.52 | 87.25 | 87.37 | 86.28 | 85.35 | 83.91 | 83.09 | 83.13 |
| 485 | 78.58 | 79.63 | 82.1 | 84.55 | 86.41 | 87.35 | 87.66 | 86.81 | 86.04 | 84.79 | 83.99 | 83.96 |
| 490 | 78.51 | 79.49 | 81.91 | 84.39 | 86.34 | 87.43 | 87.91 | 87.33 | 86.72 | 85.6 | 84.84 | 84.79 |
| 495 | 78.32 | 79.25 | 81.63 | 84.08 | 86.1 | 87.34 | 88.01 | 87.62 | 87.18 | 86.15 | 85.51 | 85.43 |
| 500 | 78.03 | 78.89 | 81.2 | 83.63 | 85.72 | 87.06 | 87.88 | 87.67 | 87.43 | 86.54 | 85.98 | 85.87 |
| 505 | 77.8 | 78.59 | 80.81 | 83.24 | 85.36 | 86.71 | 87.7 | 87.71 | 87.59 | 86.86 | 86.39 | 86.25 |
| 510 | 77.58 | 78.35 | 80.48 | 82.89 | 84.99 | 86.42 | 87.49 | 87.71 | 87.76 | 87.17 | 86.77 | 86.63 |
| 515 | 77.39 | 78.09 | 80.15 | 82.55 | 84.61 | 86.16 | 87.31 | 87.66 | 87.83 | 87.41 | 87.08 | 86.92 |
| 520 | 77.29 | 77.9 | 79.9 | 82.23 | 84.31 | 85.94 | 87.16 | 87.65 | 87.95 | 87.63 | 87.39 | 87.19 |
| 525 | 77.07 | 77.59 | 79.52 | 81.8 | 83.87 | 85.52 | 86.79 | 87.43 | 87.85 | 87.64 | 87.5 | 87.31 |
| 530 | 77.11 | 77.57 | 79.4 | 81.64 | 83.7 | 85.35 | 86.69 | 87.45 | 87.99 | 87.87 | 87.81 | 87.59 |
| 535 | 77.11 | 77.55 | 79.3 | 81.51 | 83.52 | 85.21 | 86.58 | 87.44 | 88.07 | 88.09 | 88.08 | 87.87 |
| 540 | 76.95 | 77.3 | 78.97 | 81.15 | 83.12 | 84.8 | 86.24 | 87.19 | 87.89 | 88.02 | 88.05 | 87.83 |
| 545 | 77.04 | 77.33 | 78.96 | 81.05 | 83 | 84.69 | 86.16 | 87.19 | 87.94 | 88.16 | 88.28 | 88.07 |
| 550 | 76.98 | 77.23 | 78.77 | 80.76 | 82.67 | 84.37 | 85.83 | 86.97 | 87.76 | 88.09 | 88.28 | 88.04 |
| 555 | 76.88 | 77.09 | 78.56 | 80.49 | 82.35 | 84.03 | 85.5 | 86.7 | 87.58 | 87.99 | 88.22 | 87.96 |
| 560 | 76.83 | 77 | 78.4 | 80.29 | 82.13 | 83.76 | 85.23 | 86.48 | 87.43 | 87.87 | 88.16 | 87.95 |
| 565 | 76.75 | 76.89 | 78.2 | 80.08 | 81.89 | 83.46 | 84.95 | 86.22 | 87.21 | 87.75 | 88.06 | 87.85 |
| 570 | 76.78 | 76.87 | 78.1 | 79.91 | 81.66 | 83.25 | 84.73 | 86.04 | 87.02 | 87.63 | 88 | 87.78 |
| 575 | 76.81 | 76.86 | 78.06 | 79.79 | 81.48 | 83.03 | 84.49 | 85.86 | 86.87 | 87.54 | 87.93 | 87.7 |
| 580 | 76.88 | 76.84 | 77.99 | 79.67 | 81.31 | 82.84 | 84.3 | 85.65 | 86.71 | 87.38 | 87.84 | 87.64 |
| 585 | 76.83 | 76.79 | 77.87 | 79.49 | 81.08 | 82.59 | 84 | 85.4 | 86.45 | 87.17 | 87.65 | 87.45 |
| 590 | 76.84 | 76.76 | 77.75 | 79.32 | 80.86 | 82.32 | 83.73 | 85.14 | 86.18 | 86.97 | 87.47 | 87.25 |
| 595 | 76.86 | 76.71 | 77.66 | 79.15 | 80.66 | 82.04 | 83.47 | 84.87 | 85.91 | 86.77 | 87.27 | 87.05 |
| 600 | 76.91 | 76.7 | 77.6 | 79.05 | 80.48 | 81.85 | 83.24 | 84.64 | 85.66 | 86.56 | 87.08 | 86.89 |
| 605 | 76.89 | 76.65 | 77.48 | 78.85 | 80.28 | 81.58 | 82.94 | 84.34 | 85.37 | 86.23 | 86.84 | 86.62 |
| 610 | 76.94 | 76.68 | 77.48 | 78.79 | 80.18 | 81.4 | 82.75 | 84.14 | 85.19 | 86.07 | 86.64 | 86.47 |
| 615 | 76.95 | 76.69 | 77.42 | 78.66 | 79.99 | 81.23 | 82.52 | 83.91 | 84.95 | 85.83 | 86.42 | 86.29 |
| 620 | 76.95 | 76.69 | 77.33 | 78.54 | 79.81 | 81.02 | 82.27 | 83.66 | 84.66 | 85.54 | 86.17 | 86.02 |
| 625 | 77.05 | 76.71 | 77.36 | 78.51 | 79.68 | 80.86 | 82.08 | 83.47 | 84.46 | 85.31 | 85.97 | 85.8 |
| 630 | 77.12 | 76.75 | 77.3 | 78.4 | 79.59 | 80.71 | 81.9 | 83.24 | 84.19 | 85.1 | 85.75 | 85.6 |
| 635 | 77.21 | 76.81 | 77.27 | 78.35 | 79.5 | 80.56 | 81.74 | 83.06 | 84.01 | 84.9 | 85.55 | 85.41 |

TABLE 5-continued

The percentage of light transmitted as a function of wavelength and position.

| Wavelength (nm) | Position (inches) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 640 | 77.31 | 76.9 | 77.32 | 78.36 | 79.43 | 80.47 | 81.58 | 82.85 | 83.85 | 84.77 | 85.37 | 85.27 |
| 645 | 77.29 | 76.83 | 77.24 | 78.24 | 79.25 | 80.26 | 81.33 | 82.64 | 83.57 | 84.48 | 85.12 | 84.98 |
| 650 | 77.39 | 76.88 | 77.27 | 78.19 | 79.15 | 80.14 | 81.2 | 82.46 | 83.35 | 84.27 | 84.92 | 84.76 |
| 655 | 77.48 | 76.98 | 77.29 | 78.15 | 79.14 | 80.06 | 81.1 | 82.26 | 83.17 | 84.07 | 84.71 | 84.57 |
| 660 | 77.48 | 76.99 | 77.27 | 78.1 | 79.02 | 79.91 | 80.89 | 82.02 | 82.91 | 83.82 | 84.45 | 84.3 |
| 665 | 77.57 | 77.01 | 77.29 | 78.08 | 78.95 | 79.81 | 80.73 | 81.85 | 82.75 | 83.62 | 84.23 | 84.13 |
| 670 | 77.65 | 77.05 | 77.29 | 78.05 | 78.83 | 79.68 | 80.59 | 81.69 | 82.57 | 83.39 | 84 | 83.92 |
| 675 | 77.7 | 77.17 | 77.31 | 78.03 | 78.76 | 79.57 | 80.49 | 81.54 | 82.39 | 83.16 | 83.78 | 83.71 |
| 680 | 77.71 | 77.18 | 77.29 | 77.95 | 78.7 | 79.45 | 80.34 | 81.37 | 82.17 | 82.96 | 83.56 | 83.47 |
| 685 | 77.92 | 77.28 | 77.43 | 78.06 | 78.74 | 79.48 | 80.29 | 81.32 | 82.07 | 82.89 | 83.48 | 83.35 |
| 690 | 78.08 | 77.45 | 77.53 | 78.13 | 78.8 | 79.49 | 80.29 | 81.26 | 82.04 | 82.82 | 83.4 | 83.28 |
| 695 | 78.07 | 77.53 | 77.54 | 78.08 | 78.73 | 79.4 | 80.18 | 81.12 | 81.84 | 82.56 | 83.15 | 83.03 |
| 700 | 78.21 | 77.6 | 77.61 | 78.13 | 78.75 | 79.39 | 80.09 | 81.04 | 81.73 | 82.42 | 82.98 | 82.95 |

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. An article comprising:
a transparent non-conducting layer, wherein a thickness of the transparent non-conducting layer continuously decreases in a first direction; and
a transparent conducting layer on the transparent non-conducting layer, wherein a thickness of the transparent conducting layer continuously decreases in a direction opposite to the first direction;
wherein a thickness of the article is substantially uniform;
wherein a sheet resistance, $R_s$, to a flow of electrical current through the transparent conducting layer, varies as a function of position in the transparent conducting layer;
wherein a ratio of a value of maximum sheet resistance, $R_{max}$, to a value of minimum sheet resistance, $R_{min}$, in the transparent conducting layer is at least 1.5; and
wherein the article is transparent to electromagnetic radiation having a wavelength from 300 to 5000 nm.

2. The article of claim 1, wherein the ratio of the value of maximum sheet resistance, $R_{max}$, to the value of minimum sheet resistance, $R_{min}$, in the transparent conducting layer is at least 5.

3. An article comprising:
a first transparent conducting layer, wherein a thickness of the first transparent conducting layer continuously decreases in a first direction and the first transparent conducting layer has a first bulk resistivity; and
a second transparent conducting layer on the first transparent conducting layer, wherein a thickness of the second transparent conducting layer continuously decreases in a direction opposite to the first direction and the second transparent conducting layer has a second bulk resistivity;
wherein a thickness of the article is substantially uniform;
wherein the first bulk resistivity is higher than the second bulk resistivity;
wherein a sheet resistance, $R_s$ of the article, varies as a function of position in the transparent conducting layer;
wherein a ratio of a value of maximum sheet resistance, $R_{max}$, to a value of minimum sheet resistance, $R_{min}$ in the article is at least 1.5; and
wherein the first bulk resistivity is from 600 to 800 μΩ·cm.

4. The article of claim 1, wherein the visible light transmission of the article is more than 40%.

5. The article of claim 1, wherein the visible light transmission of the article varies less than 10% in the first direction or a third direction perpendicular to the first direction.

6. The article of claim 1, wherein the visible light transmission of the article varies less than 5% in the first direction or a third direction perpendicular to the first direction.

7. The article of claim 1, wherein the reflectance of the article varies less than 4% in the first direction or a third direction perpendicular to the first direction.

8. The article of claim 1, further comprising a substrate.

9. A device comprising:
a first transparent substrate;
a first transparent non-conducting layer on the first transparent substrate, wherein a thickness of the first transparent non-conducting layer continuously decreases in a first direction; and
a first transparent conducting layer on the first transparent non-conducting layer, wherein a thickness of the first transparent conducting layer continuously decreases in a direction opposite to the first direction;
wherein a sheet resistance, $R_s$, to a flow of electrical current through the first transparent conducting layer, varies as a function of position in the first transparent conducting layer;
wherein a ratio of a value of maximum sheet resistance, $R_{max}$, to a value of minimum sheet resistance, $R_{min}$, in the first transparent conducting layer is at least 1.5; and
wherein the device is transparent to electromagnetic radiation having a wavelength from 300 to 5000 nm.

10. The device of claim 9, further comprising
a second transparent conducting layer, the first transparent conducting layer being located between the first transparent non-conducting layer and the second transparent conducting layer; and
a second transparent non-conducting layer on second transparent conducting layer;
wherein a thickness of the second transparent non-conducting layer continuously decreases in a second direction and a thickness of the first transparent conducting layer continuously decreases in a fourth direction opposite to the second direction;
wherein a sheet resistance, $R_s$, to another flow of electrical current through the second transparent conducting layer, varies as a function of position in the second transparent conducting layer; and
wherein a ratio of a value of maximum sheet resistance, $R_{max}$, to a value of minimum sheet resistance, $R_{min}$, in the second transparent conducting layer is at least 1.5.

11. The device of claim 10, further comprising a second substrate, the second transparent non-conducting layer being between the second substrate and the second transparent conducting layer.

12. The article of claim 3, wherein a visible light transmission of the article varies less than 5% in the first direction or a third direction perpendicular to the first direction.

13. The device of claim 9, wherein a visible light transmission of the device is more than 40%.

14. The device of claim 9, wherein a visible light transmission of the device varies less than 10% in the first direction or a third direction perpendicular to the first direction.

15. The device of claim 9, wherein a visible light transmission of the device varies less than 5% in the first direction or a third direction perpendicular to the first direction.

16. The article of claim 3, wherein a visible light transmission of the article varies less than 10% in the first direction or a third direction perpendicular to the first direction.

17. The article of claim 3, wherein the second bulk resistivity is from 50 to 400 µΩ·cm.

* * * * *